H. K. BURNETT.
Presses.
No. 157,089. Patented Nov. 24, 1874.
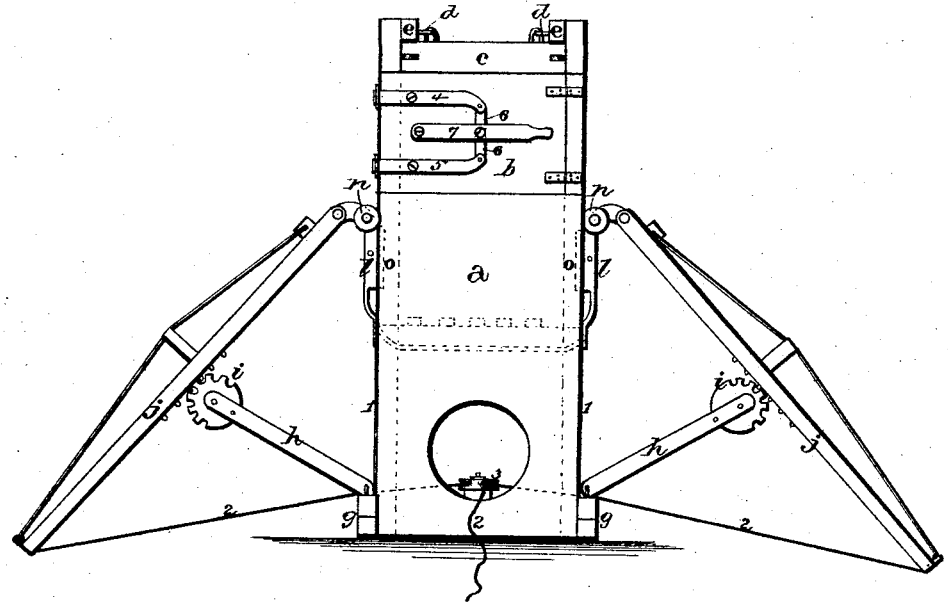
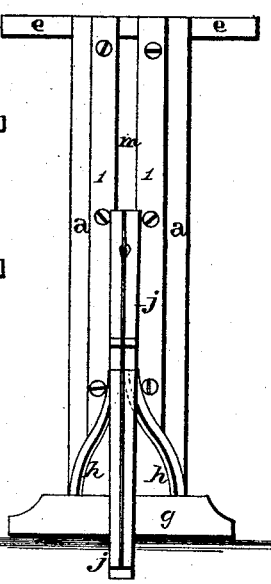
WITNESSES.
INVENTOR.

UNITED STATES PATENT OFFICE.

HENRY K. BURNETT, OF POUGHKEEPSIE, NEW YORK.

IMPROVEMENT IN PRESSES.

Specification forming part of Letters Patent No. 157,089, dated November 24, 1874; application filed October 31, 1874.

*To all whom it may concern:*

Be it known that I, HENRY K. BURNETT, of Poughkeepsie, in the county of Dutchess and State of New York, have invented certain new and useful Improvements in Presses; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in hay and cotton presses; and it consists in the arrangement and combination of devices, which will be more fully described hereafter.

The accompanying drawings represent my invention.

*a* represents an ordinary frame, provided with the door *b* on the side, through which the material to be baled is thrown. Upon the top of the press is another door, *c*, which, instead of opening upon hinges, slides horizontally back and forth across the top of the frame, upon the two guides *d*. These guides are secured to the two cross-timbers *e*, and which project to some distance out beyond the sides of the frame upon each side, so that the door can be moved to one side entirely beyond the top of the frame, leaving the bale free to be taken from the press. Pivoted to the ground sills *g*, upon which the frame rests, are the two props or braces *h*, which have cogs *i* formed upon their upper ends, which cogs mesh with the rack-bar, or cogs attached in any suitable manner to the under side of the levers *j*. To the upper ends of the levers *j* are pivoted the slides *l* and friction-rollers *n*, the lower end of the slide being attached to the follower through the slot *m*, cut in each side of the frame. The slide has extensions, flanges, or other such devices *o*, projecting outward from its sides, which catch inside of the ways 1, on each side of the slot, while the lower end is made sufficiently wide to reach across the slot and bear upon the outside of the ways, and thus the slide is held perfectly straight in position, while the rollers cause it to move easily and readily up and down. Attached to the lower ends of the levers is a rope or chain, 2, which passes around a roller, 3, in the lower part of the press, and is then attached to any suitable power.

By drawing upon the ropes, the lower ends of the levers are drawn in toward the box, which movement causes the upper ends to raise the follower upward, and thus compress the material in the frame into bales.

The door in the side of the frame is locked by means of the two levers 4 5, pivoted near their outer ends to the door itself, and having their inner ends pivoted together by means of the connecting-lever 6, the three levers forming three sides of a rectangular figure. Pivoted to the side of the door between the three levers is a hand-lever, 7, which is also pivoted, near its center, with the connecting-lever 6. By moving the inner end of this lever upward, the outer ends of the two levers 4 5 are drawn out of the catches, when the door can be opened. By moving the lever downward, the ends are forced outward into the catches, and the door thus locked.

I am aware that the operating-lever, by which the follower is raised upward, has been pivoted to and upon its supporting-brace, and this I disclaim. My invention consists in providing both the lever and its brace with cogs, so as to give the lever greater power, and a longer throw or movement.

Having thus described my invention, I claim—

1. As a locking device for the doors, the combination of the two bolts or levers 4 5, connecting-rod 6, and operating hand-lever 7, substantially as shown and described.

2. The combination of the braces *h* and levers *j*, both of them being provided with cogs or teeth, substantially as shown.

In testimony that I claim the foregoing I have hereunto set my hand this 23d day of October, 1874.

HENRY K. BURNETT.

Witnesses:
    ROBT. N. PALMER,
    GEO. S. HINCHMAN,